United States Patent Office 3,506,616
Patented Apr. 14, 1970

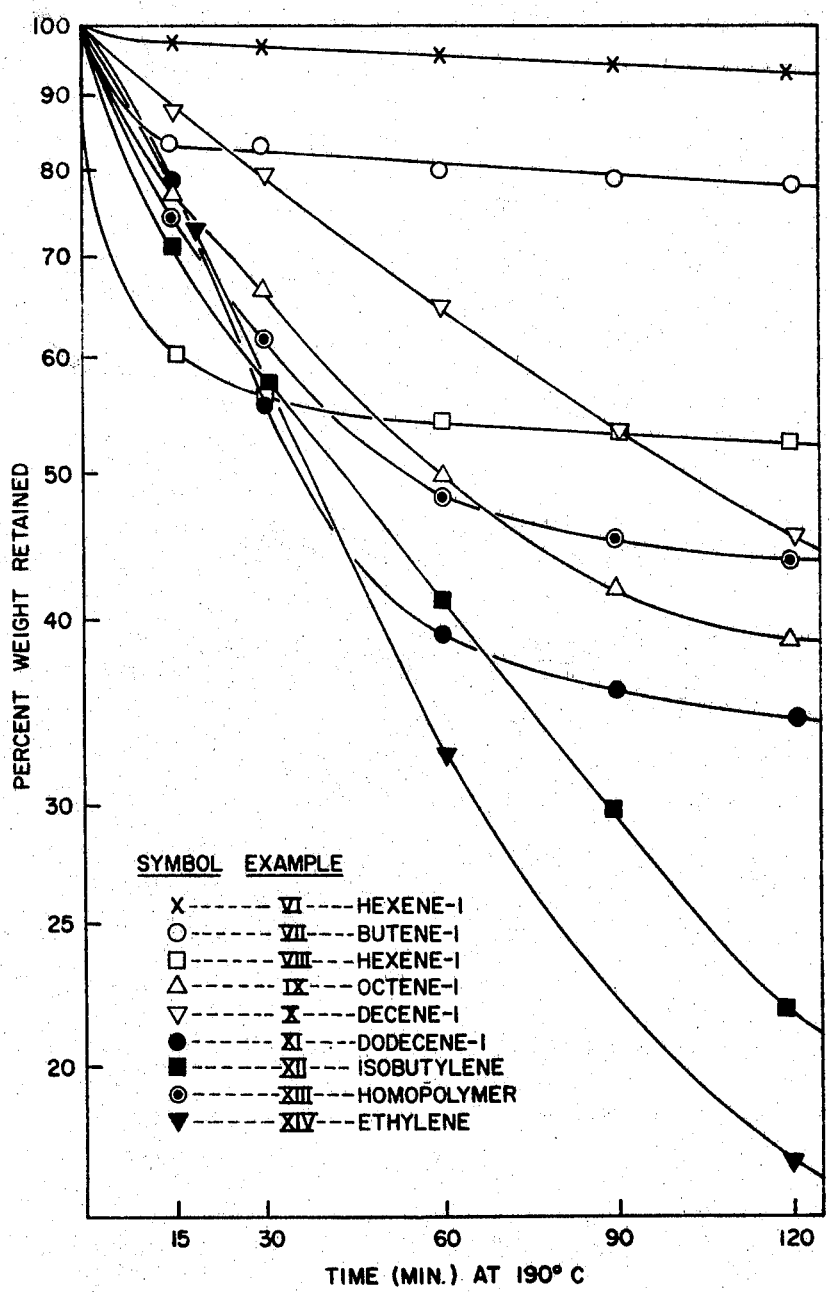

3,506,616
POLYOXYMETHYLENE INTERPOLYMERS
Calvin N. Wolf, Princeton, N.J., assignor to Ethyl Corporation, New York, N.Y., a corporation of Virginia
Continuation-in-part of application Ser. No. 428,245, Jan. 26, 1965. This application Apr. 25, 1967, Ser. No. 633,400
Int. Cl. C08g 1/18, 1/20, 1/22
U.S. Cl. 260—73
8 Claims

ABSTRACT OF THE DISCLOSURE

A composition of matter which comprises an interpolymer of (1) a formaldehyde and (2) an alpha-monoolefinic monomer having the formula $H_2C=CHR$ wherein R is an alkyl group having 2–4 carbon atoms. The alpha-monoolefinic monomer is combined intermittently at random in the polyoxymethylene chain in an amount ranging from 0.1 to about 20 mole percent. The resultant interpolymers have an inherent viscosity of from about 0.3–5.0 and a polymer melt temperature from 140° C. to 190° C. Thermal stability is vastly improved by "end-capping" the present interpolymers with materials such as: (a) an organic acid anhydride, (b) an etherification agent, such as, orthoesters, vinyl ethers, or epoxides, and (c) aliphatic or cyclic isocyanates. Included in the invention are methods for making the compositions, which include "capped" and "uncapped" polymeric compositions.

BACKGROUND OF THE INVENTION

This application is a continuation-in-part of my copending applications Ser. No. 428,245, filed Jan. 26, 1965, which is a continuation-in-part of my application Ser. No. 181,201, filed Mar. 20, 1962, now abandoned; and Ser. No. 510,575, filed Nov. 30, 1965, now abandoned.

Field of the invention

This invention relates to novel and useful high molecular weight, high melting interpolymers composed principally of polyformaldehyde. This invention further relates to processes for producing these novel interpolymers.

Description of the prior art

It has been known in the past that formaldehyde was capable of being homopolymerized. Staudinger in "Die Hochmolekularen Organischen Verbindungen" (1932), set forth such a process. However, the formaldehyde polymers obtained by this process aged in air at 105° C. such that the polymer degraded or "unzipped" into monomeric formaldehyde. MacDonald, in U.S. Patent 2,768,994, discovered a new polymerization process whereby high molecular weight formaldehyde homopolymers could be produced which were tougher and withstood higher temperatures than the low molecular weight polymers of the prior art. However, this polymer which exhibited excellent properties at low temperatures tended to degrade or "unzip" at temperatures at which the polymer had to be worked. Thus, in molding operations which require high temperatures it was found that polyformaldehyde would degrade, rendering the polymer relatively useless for this valuable operation.

Many methods have been attempted to stabilize the high molecular weight formaldehyde homopolymers. A typical method employed utilizes the compounding with the formaldehyde polymer of a stabilizer additive such as hydrazines (U.S. 2,810,708), phenols (U.S. 2,871,220), ureas, thioureas (U.S. 2,893,972), amines (U.S. 2,920,059 and 2,936,298), and benzophenones (Australian 230,163). These stabilizers are compounded into the polymer after the polymerization process. The stabilizers listed above seem to prevent, to some extent, oxidation and thermal deterioration. However, degradation is still experienced at high temperatures in the presence of air. Another method of stabilization included the essentially complete removal of the polymerization catalyst from the polymer since it was believed that the presence of a polymerization catalyst in the polymer caused degradation (U.S. Patent 2,989,-509). Combinations of the foregoing methods have also been tried (Australian 229,481).

Elimination of the problem of thermal degradation has also been attempted by copolymerization of formaldehyde (trioxane) with cyclic ethers which are essentially homologous to monomeric formaldehyde (U.S. 2,989,509). Copolymerization of formaldehyde with alkylene carbonates as set forth in U.S. Patent 3,012,990 has also been achieved in an attempt to produce a thermally stable copolymer. However, under certain conditions these copolymers degrade in the presence of a caustic or other similar alkaline material. All of these methods have been successful to a certain extent but none have cured all of the shortcomings such as degradation.

Early polymers of formaldehyde were of low molecular weight and thermally unstable. However, as early as 1932 polymers of formaldehyde were prepared with an improved thermal stability by "end-capping" the polymers (i.e. converting the terminal hydroxy groups of the polyoxymethylene into etherified or esterified terminal groups) by H. Staudinger ("Die Hochmolekularen Organischen Verbingungen," Berlin, Julius Springer, 1932, pp. 280–287). High molecular weight homopolymers of formaldehyde having improved thermal stability can be made by esterifying the polyoxymethylene glycol with a carboxylic acid anhydride in the presence of a tertiary amine according to U.S. Patent 2,998,409. British Patent 868,365 discloses the preparation of polyoxymethylene diethers by reacting a high molecular weight polyoxymethylene with a dialkyl acetal. British Patent 877,256 describes the preparation of polyoxymethylene ethers by reacting a high molecular weight polyoxymethylene with an orthoester, a ketal or an orthocarbonate. U.S. Patent 3,076,786 describes the preparation of formaldehyde-vinyl ether copolymers which can be acetylated with acetic anhydride to improve stability. End-capping of a trioxane-cyclic ether copolymer with isocyanates to enhance heat stability of the copolymer is disclosed in U.S. Patent 3,147,234.

It is therefore an object of the present invention to provide novel interpolymers which are stable to heat, and resistant to oxidative deterioration and caustic degradation. It is a further object of the present invention to provide novel interpolymers which are tough, strong, flexible and elastic in nature. It is still a further object of the present invention to provide novel interpolymers of formaldehyde and monoolefinic monomer which have beneficial qualities of the type outlined hereinabove. It is another object of the present invention to provide a process for producing the novel interpolymers having thermal and oxidative stability and exhibiting properties of toughness, strength and resilience. Other objects of this invention will be apparent from the ensuing description.

As set forth in my aforementioned copending applications, it has been found that the above and other objects are accomplished by the provision of an interpolymer of formaldehyde and an alpha-monoolefinic monomer having the formula

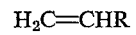

wherein R is hydrogen or an alkyl group having 1 to 30 carbon atoms. Generally, the amount of alpha-monoolefinic monomer which may be present in the interpolymers of this invention ranges from about 0.1 mole percent to about 20 mole percent, based on the interpolymer.

The preferred amount of alpha-monoolefinic monomer ranges from about 1 to about 15 mole percent while the most particularly preferred amount ranges from about 2 to about 5 mole percent. Excellent polymers are obtained especially where the most particularly preferred mole percentage of alpha-monoolefinic monomer is employed, the copolymers exhibiting the characteristics of polyoxymethylene in that they are tough and resilient and resistant to thermal degradation.

The alpha-monoolefinic monomer employed in accordance with the teaching of my prior copending applications preferably contained from 2 to about 18 carbon atoms since the copolymers obtained exhibit superior properties of thermal stability, oxidative stability, and stability to chemical degradation. The most particularly preferred olefins were those containing from 2 to 8 carbon atoms since these olefins are more economical and easily obtained.

The preferred olefins set forth in the earlier embodiment of this invention were exemplified by ethylene, propylene, butene-1, pentene-1, hexene-1, heptene-1, octene-1, nonene-1, dodecene-1, octadecene-1, 3-methyl butene-1, 4-methyl pentene-1, 3-ethyl hexene-1, 4,4-dimethyl hexene-1, and the like.

However, further research has now shown that of the copolymers prepared with the above-noted alpha-olefins certain ones of these alpha-olefins produce copolymers having unique properties, i.e. copolymers having an increased thermal stability that is strikingly superior to stability exhibited by copolymers prepared using other alpha-olefins.

It has now been found that the objects of the present invention may be more effectively accomplished by the provision of an interpolymer of a formaldehyde and an alpha-monoolefinic acyclic hydrocarbon monomer having the formula $H_2C=CHR$ wherein R is an alkyl group having 2–4 carbon atoms. The presently preferred alpha-monoolefinic monomers are usually present in the interpolymers of this invention on ranges from about 0.1 mole percent to about 20 mole percent, based on the interpolymer. The preferred amount of alpha-monoolefinic monomer ranges from about 1 to about 15 mole percent, while the most particularly preferred amount ranges from about 2 to about 5 mole percent. In accordance with the present embodiment of my invention, the most particularly preferred olefins are butene-1, pentene-1, 3-methyl butene-1, and the hexene-1 compounds such as hexene-1, 3-methyl pentene-1, and 4-methyl pentene-1.

While some copolymers made using alpha-monoolefins containing seven or more carbon atoms exhibit improved thermal stability over many of the formaldehyde copolymers previously known in the art, the presently preferred copolymers made using $C_4$–$C_6$ alpha-monoolefins have an increased thermal stability which is even superior to copolymers made using the alpha-monoolefins on either side of the $C_4$–$C_6$ group. In particular, it has been found that the present embodiment of my invention provides copolymers which have a thermal stability which is far superior to that of a copolymer of ethylene and trioxane and is also superior to a copolymer prepared from isobutylene and trioxane.

Although not desiring to be bound by theoretical considerations, it is believed that in the novel interpolymers of this invention the monoolefinic hydrocarbon monomer is bonded intermittently at random to the carbon atoms in the repeating formaldehyde molecule such as

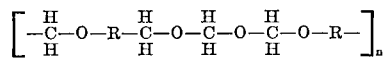

wherein R represents a saturated hydrocarbon group corresponding to the alpha-olefin comonomer used in forming the interpolymer. For example, when ethylene is the olefin employed, R is an ethylene group.

A different formula which shows the probable theoretical molecular structure is

wherein $m$ is an integer representing the total number of polyoxymethylene groups in the polymer, and $n$ is a small integer representing the total number of hydrocarbon groups from the alpha-monoolefinic monomer that are present and scattered throughout the polyoxymethylene structure. Therefore, $n$ is from 0.1 to 20 percent of $m$.

The novel interpolymers of this invention have high molecular weights and high melting points. The molecular weights of these novel polymers generally range from about 5000 to about 200,000. However, the preferred molecular weights range from about 10,000 to about 150,000 since the copolymers obtained in this range are more easily adapted for the ultimate end uses, i.e., molding, drawing fibers, and the like. The molecular weight ranges are a direct function of the inherent viscosity. Thus, inherent viscosities ranging from about 0.3 to about 5.0 are desirable in the polymers of this invention. The most preferred inherent viscosities range from about 0.5 to about 3.0 since polymers having these viscosities are within the preferred molecular weight range. The inherent viscosity is preferably measured at 0.5 percent by weight in para-chlorophenol containing 2 percent alpha-pinene at 60° C.

The melting point (polymer melt temperature) ranges of the novel interpolymers of this invention generally range from about 140° C. up to about 190° C. The most preferred melting point ranges for the polymers is from about 150° C. up to about 185° C. since polymers within this melting point range generally exhibit superior molding characteristics.

An imporatant feature of the novel interpolymers of the present invention is the fact that severe thermal degradation or "the unzipping" effect is not experienced at elevated temperatures required for molding operations. This is particularly true of the $C_4$–$C_6$ alpha-olefin-trioxane interpolymers of the present embodiment of the invention. Coupled with this advantageous feature is the fact that these novel interpolymers exhibit properties of toughness, resilience, strength and flexibility. Still another important feature of interpolymers of this invention is their resistance to degradation in the presence of strong caustic solutions. Formaldehyde homopolymers in the past rapidly decomposed into monomeric formaldehyde upon being treated with a strongly alkaline solution. This disadvantage is not experienced to the same extent with the present interpolymers and in many cases the only modification experienced when they are treated with a caustic solution is the removal of the terminal hydroxyl groups from the polymer. This is advantageous in that the remaining polymer is resistant to the action of acids, alkalies, heat, oxidation and aging. Thus, many of the disadvantages experienced in the prior art formaldehyde polymers have now been overcome, or at least, significantly minimized.

The term "interpolymers" as used in this invention may be further defined as polymers containing 2 or more monomers as above defined, in the polymer chain. Thus, copolymers, terpolymers, tetrapolymers, and the like are all within the ambit of this invention.

The foregoing and other objects of this invention are further accomplished by the provision of a polyacetal interpolymer prepared by reacting the terminal hydroxyl groups of an interpolymer of (a) a formaldehyde and (b) an alpha-monoolefinic monomer having the formula $H_2C=CHR$ wherein R is an alkyl group having from 2–4 carbon atoms; with a material selected from the group consisting of: (x) an organic acid anhydride; (y) an etherification agent selected from the group consisting of orthoesters, vinyl ethers, and epoxides; and (z) an isocyanate selected from the group consisting of aliphatic and cyclic isocyanates.

The "end-capped" polyacetal copolymers of the present invention have a thermal stability of a much higher degree than would be expected when compared to the stability increase obtained when a formaldehyde homopolymer is "end-capped." A further unexpected advantage obtained in the stabilized polyacetal copolymers of the present invention is the high yield of copolymer obtained after the "end-capping" treatment. It has been known that the thermal stability of a crude polyoxymethylene polymer could be increased by destroying the very unstable portion by treating the polymer with an alkaline material (see Belgian Patent 602,869). However, this treatment causes a severe loss in product yield and makes such a treatment undesirable for commercial production of a polyacetal resin. The process of the present invention produces a highly stable polyacetal copolymer in good yield from a crude reaction product.

The novel interpolymers described herein are not to be confused with certain materials produced heretofore. Typical of these different materials are the compositions described by Hanford in U.S. Patent 2,373,561, according to which polymers were produced by the reaction of formaldehyde and ethylene. The melting points of these polymers range from 100° C. to about 117° C. The ethylene to formaldehyde ratio of the solid polymers was generally about 4.63 to 1 and above. In one instance where the ethylene/formaldehyde was 0.23 to 1, Hanford reports that the product was a brown viscous material having a molecular weight of only 348. Bacon, in U.S. Patent 2,391,218, reports the production of a low melting polymer of ethylene and formaldehyde in which the ethylene/formaldehyde ratio was 11/1. The melting point of the polymer described by Bacon was 100° C. In sharp contrast, the novel polymers of the present invention have high melting points, e.g. 160–180° C., and an olefin to formaldehyde ratio which is considerably less than that described in the prior art.

A further embodiment of the present invention relates to a process for producing the novel olefin-formaldehyde interpolymers of this invention. The novel interpolymers of this invention are produced by polymerizing any reactive form of formaldehyde which is essentially anhydrous with 1 or more alpha-monoolefinic monomers having from about 2 to about 32 carbon atoms. In the presently preferred embodiment the process is carried out using 1 or more alpha-monoolefinic hydrocarbons having from 4 to 6 carbon atoms. This polymerization process is conducted in the presence of a catalyst, the nature of which largely depends upon the type of formaldehyde being used in the reaction. Thus, when trioxane is being copolymerized with one or more alpha-monoolefinic monomers, generally a Lewis acid is employed. However, heterogeneous catalyst, i.e., silica-alumina, are also very active in this novel copolymerization process. Other catalysts such as Lewis bases are generally preferred when essentially anhydrous gaseous monomeric formaldehyde is being employed in the copolymerization reaction.

The novel process of the present invention can be conducted utilizing a wide variety of polymerization techniques, i.e., bulk polymerization, solution polymerization, emulsion polymerization, vapor polymerization, and like procedures.

Bulk polymerization is achieved by mixing a formaldehyde compound such as trioxane with a catalyst and the desired olefin(s). Thereafter the reaction mixture is heated to a temperature between about 50° C. to about 90° C. for a period of time sufficient to copolymerize the reaction mixture. This reaction time generaly varies from a matter of seconds up to one day, a period ranging from about 3 minutes to about 12 hours usually being sufficient. The resultant polymer obtained may then be ground up and molded, or previous to molding, subjected to purification, and/or subjected to other stabilization procedures, compounded with stabilizers or the like.

Solution polymerization generally comprises contacting formaldehyde such as trioxane with a catalyst and the desired olefins in an inert solvent such as a liquid hydrocarbon at a temperature ranging from about −90° C. up to about 200° C. The reaction is generally conducted at a pressure ranging from about atmospheric up to about 20 atmospheres. The reaction is stirred for a time sufficient to obtain the desired copolymer of the desired molecular weight after which the product is then extracted and allowed to dry. Again, subsequent treatments used in the art for improving the properties of polyformaldehyde may be used, if desired.

The inert solvents which may be employed in the solution polymerization process are any solvents which are inert to the reactants. Thus, liquid hydrocarbons (paraffins, cycloparaffins, aromatics, or mixtures of these), glycol ethers, inert monoethers (dialkyl ethers, dicycloalkyl ethers, diaryl ethers, diaralkyl ethers, or mixed ethers in which the organic groups are taken from different classes—viz., alkyl, cycloalkyl, aryl and aralkyl groups), saturated halohydrocarbons, and the like may be employed. Typical of these solvents are hydrocarbons such as hexane, heptane, octane, cyclohexane, methylcyclohexane, benzene, toluene, xylene, petroleum distillates such as naphtha, kerosene, and gasoline, halogenated hydrocarbon compounds such as carbon tetrachloride, ethylene dibromide, methylene chloride, glycol ethers such as the dimethyl ethers of diethylene glycol, the diethyl ether of diethylene glycol, monoethers such as diethyl ether, dibutyl ether, dicyclohexyl ether, dibenzyl ether, diphenyl ether, methyl phenyl ether, and the like.

Vapor polymerization comprises contacting in a reaction zone the vapors of formaldehyde and the desired olefinic monomer(s) in the presence of a catalyst at temperatures ranging from about −20 up to about 200° C. The pressure at which the vapor polymerization process can be conducted generally ranges from about atmospheric up to 200 atmospheres. The polymer may then be withdrawn as it is formed in the reaction chamber. Thereupon optional work-up and/or stabilization procedures may be utilized.

The processes as outlined above are capable of being adapted to a continuous process, a batch process or semibatch operation; for example, where vapor polymerization reaction is being conducted it may readily be converted to a continuous process by merely adding the reactants and catalysts to the reaction zone while recovering the interpolymer as soon as it is formed. An excellent example of a batchwise process is the bulk polymerization of a formaldehyde such as trioxane with an olefin after which the desired polymer may then be recovered.

Generally it is preferred to employ an essentially anhydrous inert atmosphere over the reaction mass particularly when bulk polymerization techniques are being employed. However, an inert atmosphere may be employed in other polymerization processes such as the solution polymerization and vapor polymerization. Typical of the inert gases which may be employed are carbon monoxide, nitrogen, argon, krypton, neon, helium, and the like. Certain saturated paraffinic hydrocarbons may also be employed as the inert atmosphere where the hydrocarbons are inerted to the reaction mass. Examples of paraffinic hydrocarbons which may be employed are methane, ethane, propane, and the like.

The formaldehyde employed, as stated hereinabove, can be any reactive form of formaldehyde in the essentially anhydrous state. Monomeric formaldehyde and trioxane are the best known reactive anhydrous forms which may be used. Monomeric formaldehyde can be produced by any of the general prior art methods such as is set forth by Walker in "Formaldehyde," A.C.S. Monograph Series No. 98 (1944). Typical methods employed to obtain monomeric formaldehyde are by pyrolyzing paraldehyde, polyoxymethylene, or other forms of formaldehyde. However, it is preferred in this invention to employ trioxane since it is easier to handle, especially in bulk polymerization processes. On the other hand, in vapor polymerization processes it is more desirable to employ gaseous monomeric formaldehyde which is essentially anhydrous since this compound is more easily vaporized.

Typical of the Lewis acids which are employed as catalysts in the process of this invention are the inorganic halides, particularly the inorganic fluorides, inorganic fluorides complexed with ethers and amines, metal alkoxides, sulfonyl halides, metalloidal halides, hydrogen halides, and the like. The most preferred Lewis acid catalysts are boron trifluoride, boron trifluoride etherate complexes, and boron trifluoride amine complexes since excellent results are achieved in bulk polymerization processes employing trioxane as the formaldehyde reactant.

Typical of the Lewis bases which may be employed in the process of this invention, when utilizing gaseous monomeric formaldehyde as the formaldehyde monomer, are the organo phosphines, organo stibines, organo arsines, primary amines, secondary amines, tertiary amines, the alkali and alkaline earth hydroxides, oxides and peroxides and the like..

Other catalysts which may be employed in association with gaseous monomeric formaldehyde and alpha-olefins in the present polymerization process are onium salts, metals, metal alloys, metal carbonyls, as well as various oxides, peroxides and hydroxides of the heavy metals.

The types of heterogeneous catalysts may be broadly defined as metal oxides, mixed metal oxides, acid clays, acid treated clays, and ion exchange resins. Acid types of heterogeneous catalysts generally are used in the polymerization of trioxane while the basic catalysts are employed in the polymerization of monomeric formaldehyde. However, acid ion exchange resins may be in some instances employed in both the copolymerization of trioxane or monomer formaldehyde and the alpha-olefin.

Typical examples of the heterogeneous catalysts are silica-alumina, silica magnesia, silica zirconia, alumina boria, alumina magnesia, silica gel, Permutit S-2 (which is understood to be aluminum silicate), alumina chromia, Amberlite IR (which is understood to be a phenolic methylene sulfonic cation exchanger produced by the reaction of phenol, formaldehyde, and a sulfonic acid), montmorillonite, and the like.

In addition to the foregoing catalyst, a Ziegler catalyst may be used to carry out the process described hereinbefore. Suitable Ziegler catalysts and methods for their preparation are described in my copending application Ser. No. 319,670, filed Nov. 29, 1963. Generally speaking a Ziegler catalyst is composed of an organometallic or metal hydride reductant (e.g., triethylaluminum) and a suitable compound of a transition metal (e.g., titanium tetrachloride) and is thought to be a catalytically active reaction product between these materials.

The amount of catalyst which may be employed in the process of this invention is susceptible of variation. Generally, amounts ranging from about 0.001 to about 5 percent by weight of the total reaction mass may be employed. However, the preferred amount of catalyst ranges from about 0.01 percent to about 2 percent by weight since within this range polymers having optimum properties such as strength toughness and resilience are obtained. The amount of catalyst employed in the present invention, although not critical, forms an important element of the process. Thus, it is desirable to keep the catalyst concentration within the preferred range outlined above. The temperature at which the polymerization process is conducted varies with the type of process employed. Thus, in bulk polymerization processes temperatures ranging between about 50° C. up to about 90° C. are employed. In the solution polymerization processes reaction temperatures may vary from about −90° C. up to about 200° C. whereas in vapor polymerization processes temperatures between about −20° C. up to about 200° C. are employed.

The combination of temperature and the amount of catalysts employed has a direct bearing on the molecular weight of the polymer which is produced via this invention. Thus, in general, high conversions of low molecular weight copolymers are obtained when high catalyst levels coupled with low polymerization temperatures are used. The same phenomenon occurs where a low catalyst concentration is employed coupled with high temperature. The preferred combination of temperature and amount of catalyst whereby a polymer having a high molecular weight or high inherent viscosity is produced involves use of a low catalyst level and low polymerization temperature. Thus, in a bulk polymerization process temperatures ranging between about 65° C. up to about 85° C. and catalyst concentrations varying from about 0.01 percent to about 2 percent (based on the total weight of monomers being used), are preferred in accordance with this invention. In the preferred solution polymerization process the temperature ranges from about 0° C. up to about 90° C., the catalyst concentration being the same as in the preferred bulk polymerization process.

The pressure employed in the polymerization processes of this invention depends generally on the type of formaldehyde, olefin, and catalyst being used and on the type of process technique being utilized. Thus, in the solution polymerization and vapor polymerization procedures the pressure generally ranges from atmospheric up to about 20 atmospheres. It is preferred, for example, when using a gaseous alpha-olefin to employ pressures higher than atmospheric—e.g., up to about 10 atmospheres since greater contact between or among the reactants is generally achieved within this pressure range. Furthermore, these mild pressure conditions obviate the necessity for expensive high pressure reaction equipment. In most cases it is preferable to conduct the process of this invention at atmospheric or ambient pressures.

One embodiment of the present invention provides a stable polyacetal copolymer by reacting the terminal hydroxyl groups of my polyoxymethylene copolymer with an organic acid anhydride. Suitable acylating agents are the anhydrides of saturated, monobasic aliphatic, araliphatic, cycloaliphatic and aromatic carboxylic acids having from 2 to 20 carbon atoms. The acid may be substituted by such groups as alkoxy or halogen. Examples of suitable anhydrides of aliphatic carboxylic acids are the anhydrides of acetic, propionic, butyric, caproic, decanoic, and stearic acids. Cyclohexyl carboxylic acid anhydride is a suitable cycloaliphatic anhydride. Among suitable aromatic acid anhydrides may be mentioned phenyl acetic and benzoic acid anhydrides. Mixtures of the anhydrides may also be used as an acylating agent. The preferred anhydride for use in the present invention is acetic anhydride because of its low cost and ready availability. Additionally, this anhydride is one of the most reactive of the suitable anhydrides.

The acylation of the polyoxymethylene copolymer may be carried out in a number of different ways. The copolymer may be reacted directly with the liquid acid anhydride serving as a suspending liquid. The copolymer may be suspended in an inert non-solvent for the polymer and the anhydride added to the suspension. Alternatively, the copolymer may be reacted with the anhydride by passing a stream of the acid anhydride in the gaseous state through a bed of particulate copolymer (U.S. Patent 3,125,551). Also, the copolymer and the acylating agent can be dissolved in a common inert solvent and the acetylation carried out in solution. Non-solvents suitable for use in the process of the present invention as suspending agents include paraffinic hydrocarbons such as hexane, heptane, octane, and isooctane; cycloparaffins such as cyclohexane; haloparaffins such as methylene dichloride, tetrachloroethylene, cis-1,2-dichloroethylene, and trans- 1,2-dichloroethylene; ethers such as diethyl ether, dibutyl ether, chloromethyl ether, and dicyclohexyl ether. Materials suitable as common solvents for the copolymer and the acylating agent are N,N'-dimethylformamide, N-methyl-2-pyrrolodone, gamma-butyrolacetone, N-methyl morpholine, and mixtures of the foregoing solvents. It is preferred to carry out the acylation by suspending the copolymer in the acylation agent. However, it may be carried out in a common solvent for both the acid anhydride and the copolymer.

The acylation of the copolymer may be carried out without the use of any catalyst. However, the reaction time is shortened and the degree of acylation of the copolymer is increased when a catalyst is used. Suitable catalysts are amines such as equinoline, pyridine, methylethylpyridine, triethylamine, and trimethylamine. Other catalysts are alkali metal salts such as sodium benzoate, sodium formate, potassium acetate, sodium acetate and disodium phosphate. Pyridine is a preferred catalyst since it can react with any acetic acid present in the acetic anhydride and also react with any formic acid produced by decomposition of the polyoxymethylene glycol copolymer chains.

The weight of solvent used should be from about 1 to about 40 times the weight of the copolymer to be acetylated. Preferably the weight of solvent used is from 1–10 times the weight of polymer treated.

The amount of acid anhydride used may vary over a wide range. When no solvent is used and the acid anhydride is used as a suspending medium for the copolymer up to 40 times the weight of the copolymer of the acid anhydride may be used. When the reaction is carried out in solution, the acid anhydride may be present in weights ranging from about one half the weight of copolymer treated to about 10 times the weight of copolymer treated.

The amount of catalyst used may vary from about 0.005 percent to about 75 percent of the weight of acid anhydride. When an alkali metal salt is used, it is preferably used in amounts between about 0.005 percent and about 10 percent of the weight of acid anhydride used. When an amine is used, it is preferably used in an amount from about 25 percent to about 60 percent of the weight of the acid anhydride.

The temperature of the acylation reaction is at least 50° C. and preferably from about 100° C. to about 200° C. A convenient temperature is often the reflux temperature at atmospheric pressure of the solvent or liquid anhydride being used. The reaction may be carried out at atmospheric pressure as above.

The reaction time may vary from a few minutes to as long as a week.

The acylated copolymer is filtered from the suspension media, or either cooled to room temperature or allowed to crystallize from a solvent and then filtered. The copolymer is washed several times with an organic liquid to remove the end-capping agent and catalyst and then dried for about 12 hours at 50° C., followed by vacuum drying at 40° C. to 60° C.

In another embodiment of the present invention a stable polyacetal copolymer is provided by reacting the terminal hydroxyl groups of my polyoxymethylene copolymer with an isocyanate. The isocyanate may be present in the form of a monomer or a polymer. Suitable isocyanates for use in the present invention are those of the aliphatic, araliphatic, cycloaliphatic, or aromatic series. Aliphatic monoisocyanates containing alkyl groups having from 2 to about 20 carbon atoms are suitable, such as ethyl isocyanate, propyl isocyanate, butyl isocyanate, octadecyl isocyanate. They may be substituted by halogen or contain hetero atoms such as oxygen in the carbon chain, e.g., ω-chlorohexyl isocyanate, γ-ethoxypropylisocyanate. Suitable aliphatic diisocyanates are tetramethylene diisocyanate and hexamethylene diisocyanate. Cycloaliphatic monoisocyanates such as cyclohexyl isocyanate, cyclooctyl isocyanate are suitable. The ring may be substituted by alkyl or alkoxy groups, e.g., methoxy cyclohexyl isocyanate. Cyclohexane diisocyanate is representative of the suitable cycloaliphatic diisocyanates that may be used. Suitable aromatic monoisocyanates; which may be substituted in the ring by radicals such as halogen, nitro, alkyl, alkoxy, are phenyl isocyanate; tolyl isocyanate, naphthyl isocyanate, p-chlorophenyl isocyanate, p-nitrophenyl isocyanate, p-methoxyphenyl isocyanate, and m-bromophenyl isocyanate. Among suitable aromatic diisocyanates, which may have the same or other substituents as the above monoisocyanates in the ring, are the following: toluene 2,4-diisocyanate, toluene 2,6-diisocyanate, 3,3'-diisocyanate, 3,3'-dimethyl-4,4'-diphenylene diisocyanate, 1,5-naphthalene diisocyanate, p,p'-diphenylmethane diisocyanate, m-phenylene dissocyanate, p-phenylene diisocyanate, 1-methyl-3,5-diethyl benzene-2,4-diisocyanate, 1 - methyoxybenzene - 2,4 - diisocyanate, and 1-chlorobenzene-2,4-diisocyanate.

The aromatic isocyanates and diisocyanates are the preferred isocyanates for use in the present invention. A particularly preferred isocyanate is toluene 2,4-diisocyanate.

The reaction of my polyacetal copolymer with the isocyanate can be carried out in the same manner as described hereinbefore for the reaction with the acid anhydride, i.e., the isocyanate may serve as the suspending agent, or it may be dissolved in a common solvent for my polyacetal copolymer, viz.-dimethyl formamide.

The amount of isocyanate used may vary over a wide range. Generally, a weight of isocyanate from about $\frac{1}{20}$ to about 2 times the weight of polyacetal copolymer may be used. Preferably, a weight of about $\frac{1}{10}$ to about 1.5 times the weight of copolymer should be used.

The isocyanation reaction may be carried out at a temperature of from about 50° C. to about 200° C. Preferably, the temperature is between 120° C. to 190° C. The time required for the reaction may vary over wide limits, from as low as a few minutes to as long as a week. The reaction may be conducted at atmospheric pressure or at above atmospheric. Also, an inert atmosphere may be provided for carrying out the isocyanation reaction.

In another embodiment of the present invention a stable polyacetal copolymer is provided by reacting the terminal hydroxyl groups of my polyoxymethylene copolymer with an orthoester. Suitable orthoesters are trimethyl orthoformate, triethyl orthoformate, tripropyl orthoformate, tributyl orthoformate, trimethyl orthoacetate, triethyl orthoacetate, tripropyl orthoacetate, tributyl orthoacetate, trimethyl orthopropionate, triethyl orthopropionate, tripropyl orthoproprionate, and tributyl orthopropionate. The reaction with an orthoester is preferably carried out in the presence of an acid catalyst. Preferred catalysts are boron trifluoride or phosphorous pentafluoride or their ether complexes, e.g., boron trifluoride dibutyl etherate, phosphorous pentafluoride diethyl etherate. These catalysts should be used in quantities ranging from about 0.001 percent to about 0.5 percent by weight of the amount of the orthoester used. The orthoester should be used in an amount between about $\frac{1}{10}$ to about 10 times the weight of copolymer treated. The esterification with orthoester may be carried out under the same solvent, temperature, pressure, time and other conditions as set forth hereinbefore for esterification with an acid anhydride.

In another embodiment of the present invention a stable polyacetal copolymer is provided by reacting the terminal hydroxyl groups of my polyoxymethylene copolymer with a vinyl ether. Suitable classes of vinyl ethers are the vinyl alkyl ethers and the vinyl alkenyl ethers. Among the suitable ethers are vinyl methyl ether, vinyl ethyl ether, vinyl propyl ether, vinyl butyl ether, vinyl isobutyl ether, vinyl pentyl ether, vinyl hexyl ether, vinyl heptyl ether, vinyl octyl ether, vinyl-2-ethylhexyl ether, divinyl ether, vinyl propenyl ether, vinyl allyl ether, vinyl 1-butenyl ether, vinyl 2-butenyl ether, vinyl cyclobutyl ether and vinyl cyclohexyl ether. Generally, the alkyl and alkenyl radicals of the ethers should have from 1 to 8 carbon atoms and the cycloalkenyl radicals should have from 4 to 6 carbon atoms. Etherification with vinyl ethers may be carried out using the same quantity of reactants, the same catalysts, solvents, temperatures, pressures, times, etc. as used in end-capping the copolymer with an orthoester.

In still another embodiment of the present invention, a stable polyacetal copolymer is provided by reacting the terminal hydroxyl groups of my polyoxymethylene copolymer with an epoxide. Suitable epoxides are 1,2-propylene oxide, epichlorohydrin and 1,2-butylene oxide. A preferred epoxide is epichlorohydrin because of the ease with which it reacts with the copolymer and because of its low cost and ready availability. Etherification with epoxides may be carried out using the same quantity of reactants, catalysts, solvents, temperatures, pressures, times, etc. as used in end-capping the copolymer with an orthoester.

The processes by which these novel copolymers are produced will be further understood from the following examples. In all of the examples all parts are by weight unless otherwise specified.

EXAMPLES I–III

Five copolymerization runs were made employing the bulk polymerization technique. Propene, 1-butene and 1-hexene were individually employed as the monoolefinic monomers. The technique employed comprises reacting 20 parts of trioxane under dry nitrogen with one part of the olefinic monomer in the presence of boron trifluoride diethyl etherate catalyst and heating the mixture to the melting point (70° C.) while stirring. The reaction conditions and the results obtained by this copolymerization process are set forth in Table 1.

TABLE 1.—COPOLYMERIZATION OF TRIOXANE WITH ALPHA OLEFINS
[Examples I–III]

| Comonomer | Catalyst [1] | Time, hr. | $\eta_{inh}$ | PMT, °C. | $T_m$, °C. | Yield, percent |
|---|---|---|---|---|---|---|
| Propene, 5 wt. percent | 0.2 | 2 | 0.46 | 175–178 | 158 | 70 |
| 1-butene, 5 wt. percent | 0.2 | 2 | 0.40 | 174–175 | 156 | 25 |
| 1-hexene, 5 wt. percent | 0.2 | 1 | 0.91 | 170–179 | 153 | 44 |

[1] Parts by volume.
$\eta_{inh}$ = Inherent viscosity.
PMT = Polymer melt temperature.
$T_m$ = Crystalline melting point.

When the above examples are repeated employing olefins such as 4-methyl pentene-1, heptene-1, octene-1, 3-methyl butene-1, octadecene-1, dodecene-1, tricosene-1, and the like, similar results are obtained.

EXAMPLE IV

Into a reaction pot equipped with a high speed stirrer was charged 100 parts of trioxane and 220 parts of benzene. The essentially anhydrous reaction mixture was flushed with dry nitrogen. Dry propene was passed into the stirred solution and 0.1 part of boron trifluoride etherate catalyst was added. Stirring accompanied with admission of propene was continued for 6 hours with another 0.1 part of catalyst added hourly.

Methyl alcohol (158 parts) was thereafter added to the reaction mass and the suspension of polymer was filtered. The polymer was then extracted with benzene for one hour and allowed to dry in the air after which it was dried in vacuum. The carbon analysis for $(CH_2O)_x$ is 40.00 while the carbon analysis of the copolymer obtained was 41.28. The polymer obtained had a polymer melt temperature of 159–161° C. The crystalline melting point was 148–150° C. The inherent viscosity of the formaldehyde-propene copolymer was 0.27.

Similar copolymers are obtained when other alpha-olefins such as 4-methyl pentene-1, 3-methyl octene-1, 3-butyl-4-hexyl heptene-1, octadecene-1, dodecene-1, tricosene-1, hexacosene-1, dotriacotene, 5-propyl-7,8-dimethyl nonene-1, 7-methyl nonene-1, 4,5-dimethyl heptene-1, and the like are employed.

EXAMPLE V

Into a reaction pot equipped with a high speed stirrer was charged 100 parts trioxane, 220 parts of benzene and 5 parts of 1-octene. The essentially anhydrous reaction mixture was flushed with dry nitrogen and stirred for 6 hours. Boron trifluoride diethyl etherate catalyst (0.10 part) was added with the initiation of the stirring, 0.10 part being added every hour thereafter for 6 hours. Some product was formed after 6 hours. The process was then permitted to conttinue for a period of 4 days obtaining a polyoxymethylene/1-octene copolymer in a 16 percent yield. The product had a polymer melt temperature of 161–163° C., a crystalline melting point of 155° C. and and inherent viscosity of 0.31 at 0.5 percent by weight in parachlorophenol containing 2 percent alpha-pinene at 60° C. The analytical data obtained is as follows:

Calc. for $(CH_2O)_x$ (percent): C, 40.00; H, 6.66. Found (percent): C, 42.50; H, 7.50.

Subsequent to the polymerization set forth in Examples I–V, additional copolymerizations of alpha-olefins with either trioxane or formaldehyde were conducted in which the copolymers produced were subjected to thermal stability tests. In copolymerization Examples VI-XIII, the polymerizations were conducted at atmospheric pressure in a resin flask which had been dried in an oven at 150° C. and then cooled by flushing with nitrogen. Trioxane was added to the resin flask in a dry nitrogen box. The auxiliary equipment, dried in a 150° C. oven, was attached to the flask under a nitrogen flush. Solvent and a comonomer were then added. When using low boiling comonomers, a Dry Ice reflux was used to prevent loss of the comonomer. When the reactor contents reached the desired temperature, the stirrer was started and the catalyst solution was then added, usually over about a five-minute period. Polymerization was stopped by the addition of 100–200 ml. of methanol.

After the polymerization, two volumes of methanol were added to the flask and the mixture stirred thoroughly. The copolymer product was then filtered and washed three more times with one volume of methanol. Finally the polymer was dried under vacuum at room temperature.

In carrying out the copolymerization run in Example XIV, substantially the same equipment was used as in Examples VI–VIII. The monomeric formaldehyde was prepared by pyrolyzing paraformaldehyde in a heating mantle and passing the gaseous formaldehyde through two U-tubes immersed in a —15° to —20° bath. The monomeric formaldehyde was then passed into the resin kettle and dissolved in the solvent. The solvent was stirred vigorously while the formaldehyde was being absorbed in the solvent. A Ziegler catalyst complex was prepared by charging a flask with 50 mls. of decahydronaphthalene and stirring under nitrogen at room temperature. Nine moles of triethylaluminum were added and stirred for five minutes after which three moles of titanium tetrachloride were added and stirred until a dark brown complex formed. A portion of the complex was added by pipette to the reactor. After the catalyst complex had stirred in the reactor for tweny-five minutes, ethylene was slowly added to the reactor by way of the nitrogen stream which was being passed into the reaction mixture.

The reaction conditions and polymer properties for Runs VI–XIV are set forth in Table 2.

In order to determine the thermal stability of the copolymers prepared in Examples VI–XIV, weighed samples of the copolymers were placed in a flask, attached to a vacuum pump and heated to a temperature of 190° while maintaining a vacuum of at least 1 mm. Hg throughout the test period. At the end of 15 minutes, each polymer sample was removed from the depolymerization flask, cooled in a desiccator, and reweighed. The polymer samples were placed back in the depolymerization flask and the heating and vacuum reapplied. At the end of thirty minutes elapsed time, the sample weighing was repeated. The samples were again subjected to temperature and vacuum and weighed at intervals of 60 minutes, 90 minutes, and 120 minutes. The percent weight retained by each of the polymer samples is shown in Table 3.

The data given in Table 3 is plotted and shown in graphical form in FIG. 1. As can be seen in Table 3 and in FIG. 1, the copolymers which have the highest resistance to thermal degradation are those made using the alpha-monoolefins, butene-1 and hexene-1. Example VI shows a very high stability for the hexene-1 copolymer.

mers which do not contain a major portion of stable copolymer as evidenced by the lack of a flattening of their decomposition curves as seen in FIG. 1. Thus the preferred interpolymers of the present embodiment of the invention are interpolymers of a formaldehyde and a $C_4-C_6$ monoolefin which interpolymer (unstabilized) retains at least fifty percent of its weight after being heated for two hours at about 190° C. under a pressure of about 1 mm. of Hg.

As can be seen in the plot for Example XIII, the homopolymer of trioxane is in fact a more stable material than the copolymers prepared from octene-1 and dodecene-1. The homopolymer is also far more thermally stable than the ethylene and isobutylene interpolymers.

Thus the preferred copolymers of the present invention made using $C_4-C_6$ alpha monoolefins provide an interpolymer which is superior in heat stability to a trioxane homopolymer, to interpolymers made from alpha monoolefins having $C_2-C_3$ carbon atoms, and to interpolymers

TABLE 2.—ADDITIONAL COPOLYMERIZATIONS OF ALPHA OLEFINS WITH A FORMALDEHYDE

| Example | Tri-oxane, g. | Comonomer | g. | Solvent [1] | Catalyst, ml. | Reaction Time, hrs. | Temp., °C | Conversion, percent | PMT °C. | $\eta$ inh |
|---|---|---|---|---|---|---|---|---|---|---|
| VI | 19.8 | Hexene-1 | 3.4 | NB | [2] 0.08 | | 30 | 4.5 | 166–167 | 0.57 |
| VII | 98 | Butene-1 | 2 | CH | [3] 0.05 | 3 | 55–60 | 3.8 | 165–166 | 0.20 |
| VIII | 98 | Hexene-1 | 2 | CH | [3] 0.05 | 3 | 55–60 | 7.3 | 169–171 | 0.23 |
| IX | 98 | Octene-1 | 2 | CH | [3] 0.05 | 3 | 55–60 | 19.9 | 174–177 | 0.58 |
| X | 98 | Decene-1 | 2 | CH | [3] 0.05 | 3 | 55–60 | 18.8 | 175–178 | 0.43 |
| XI | 98 | Dodecene-1 | 2 | CH | [3] 0.05 | 3 | 55–60 | 29.7 | 179–181 | 0.37 |
| XII | 98 | Isobutylene | 2 | CH | [3] 0.05 | 4 | 55 | 6.3 | 180–182 | 0.28 |
| XIII | 400 | | | EA | [3] 0.20 | 66 | 35 | 48 | 182–185 | 1.47 |
| XIV | [4] 130 | Ethylene | 21 | DHN | ([5]) | 3 | 22–24 | 24.6 | 180 | 1.79 |

[1] NB is nitrobenzene.
CH is cyclohexane.
EA is ethyl acetate.
DHN is decahydronaphthalene.
[2] Boron trifluoride diethyl etherate.
[3] Boron trifluoride dibutyl etherate.
[4] Monomeric formaldehyde used in place of trioxane.
[5] Catalyst is TiCl$_4$ (3 millimoles) and $(C_2H_5)_3$Al (9 millimoles).

TABLE 3.—THERMAL STABILITY OF COPOLYMERS OF AN ALPHA OLEFIN AND A FORMALDEHYDE

| | Percent Weight Retained | | | | |
|---|---|---|---|---|---|
| | 15 min. | 30 min. | 60 min. | 90 min. | 120 min. |
| VI | 98 | 98 | 97 | 96 | 95 |
| VII | 84 | 84 | 80 | 79 | 78 |
| VIII | 60 | 57 | 54 | 53 | 52 |
| IX | 77 | 66 | 50 | 42 | 39 |
| X | 88 | 80 | 65 | 53 | 45 |
| XI | 79 | 56 | 40 | 36 | 34 |
| XII | 72 | 58 | 41 | 30 | 23 |
| XIII | 75 | 62 | 49 | 47 | 46 |
| XIV | 73 | | 32 | | 8 |

Copolymers made from the preferred $C_4$ olefins, the $C_5$ and $C_6$ olefins are characterized in that their rate of degradation after the first thirty minutes is extremely slow. This is to be contrasted with the thermal stability of the copolymer of the lower olefin, ethylene, which has an extremely high rate of degradation throughout the test period. In fact, the degradation of the ethylene copolymer is almost linear. The exception to the general increased stability for $C_4-C_6$ olefins is manifested in the interpolymer wherein isobutylene is the comonomer. As seen from the data for Example XII, the isobutylene copolymer has a stability which is so poor as to render the copolymer wholly unsatisfactory for any potential commercial use. The reasons why this particular $C_4$ olefin makes a very unstable copolymer is not known. Another odd characteristic of the isobutylene-trioxane copolymer is the difficulty in obtaining a copolymer using these reactants—two other runs in which it was attempted to copolymerize isobutylene and trioxane were unsuccessful. This is surprising in view of isobutylene's known high polymerization reactivity.

As can be seen the alpha monoolefins having 7 or more carbon atoms produce copolymers having very poor thermal stability as compared to the $C_4-C_6$ alpha olefin copolymers The octene-1, decene-1, and dodecene-1 copolymers are characterized by their high rate of decomposition. Apparently, these comonomers produce interpolymers made from alpha olefins having 7 or more carbon atoms.

The novel interpolymers of the present invention are resistant to chemical degradation. When the copolymers of this invention are treated with a 10 percent aqueous sodium hydroxide solution at temperatures between room temperature and reflux temperature for from about one minute to about one hour, the net polymer loss ranges from about 2 percent to about 60 percent. Thus, in preparing the novel copolymers of this invention, it is desirable to first submit the raw copolymer product to a caustic treatment. Thus, in treating the crude copolymer it is desirable to use an alkaline solution having a pH of between about 8 and about 14 at about room temperature up to about 90° C. for a time ranging from about 1 to about 10 minutes. For reasons of economy and time, it is desirable to contact the crude copolymers of this invention with a 10 percent aqueous sodium hydroxide solution. The products thus obtained are even more stable to heat, light and oxidation. The strong bases which can be used in this preferred after-treatment include the alkali and alkaline earth metal hydroxides, oxides, carbonates, acetates and the like; strong organic bases; ammonia, and the like. Typical examples of these bases which may be employed are potassium hydroxide, calcium oxide, barium hydroxide, magnesium oxide, sodium carbonate, sodium acetate, calcium propionate, ammonia, dimethyl amine, diethyl amine, dipropyl amine, dibutyl amine, tetramethyl guanidine, and the like.

In effecting this after treatment systems other than aqueous alkaline systems may be employed. Thus, the appropriate strong base may be dissolved in a solvent such as dimethyl formamide, benzyl alcohol, methanol, anisole, ethylene glycol, or the like. In some instances alkaline solvent systems which contain a hydroxyl group such as benzyl alcohol, methanol and ethylene glycol, function as the agent of controlled degradation even in the absence of the above basic substances.

The following examples illustrate methods of "end capping" the interpolymers of the present invention to further increase their thermal stability. All percentages and parts in the following examples are by weight unless otherwise noted.

EXAMPLE XV

A copolymer of trioxane and hexene-1 was prepared from 100 parts of trioxane and 3.0 parts of hexene-1 in 10 parts of tetrachloroethylene using 10 ml. phosphorus pentafluoride as catalyst. After 50 minutes of reaction time, a copolymer was obtained in 31.0 percent yield. The untreated copolymer had an inherent viscosity of 0.31, a polymer melting temperature of 165° C., and a crystalline melting point of 151° C. The untreated unstabilized copolymer had a thermal stability of 38.3 percent weight retention.

The copolymer was treated by acetylating the hydroxyl end groups with acetic anhydride. 30 grams of the copolymer were placed in a flask with 600 ml. of dimethylformamide, 12 ml. of pyridine 30 ml. of acetic anhydride. The copolymer was treated at the reflux temperature of dimethylformamide (144°–150° C.) for one hour. The treated copolymer was washed with distilled water, methanol, acetone, and dried for 4–6 hours at 55° C. in a vacuum. The treated copolymer retained 94.7 percent of its original weight, had an inherent viscosity of 1.38, a polymer melting temperature of 160° C., and a crystalline melting point of 148° C. The terminal stability of treated copolymer was determined at 222° C. by placing 1 g. of the copolymer in a ½ oz. narrow-neck, clear glass bottle covered with aluminum foil which was perforated with a 1 mm. diameter hole. The unstabilized treated copolymer retained 86.5 percent of its original weight after one hour and 65.7 percent after two hours. When stabilized with 5.0 parts of diphenylamine, the treated copolymer retained 91.3 percent of its original weight after one hour and 73.7 percent after two hours. The treated unstabilized copolymer had a tensile strength of 7950 lb./sq. in., an elongation of 15.0 percent, and a tensile modulus of 280,750 lb./sq. in.

EXAMPLE XVI

A copolymer of trioxane and hexene-1 was prepared according to the procedure of Example XV, except that boron trifluoride etherate was used in place of phosphorus pentafluoride.

A 30.0 g. portion of the copolymer was treated with acetic anhydride in the same manner as the copolymer in Example XV. This treated portion of the copolymer retained 89.8 percent of its original weight, had an inherent viscosity of 1.34, a polymer melting temperature of 163° C. and a crystalline melting point of 148° C.

EXAMPLE XVII

A copolymer of hexene-1 and trioxane is prepared according to the procedure of Example XV. One portion of this copolymer is treated with trimethyl orthoformate in the presence of phosphorus pentafluoride. The treated polymer exhibits an increase in thermal stability. Another portion of the untreated copolymer is treated with vinyl methyl ether in the presence of phosphorus pentafluoride. The etherified copolymer exhibits a higher thermal stability than does the untreated copolymer. A third portion of the untreated copolymer is treated with epichlorohydrin in the presence of phosphorus pentafluoride. The treated copolymer has an increased thermal stability compared to the untreated copolymer.

Similar results are obtained when other alpha olefins such as 4-methyl pentene-1, 3-methyl octene-1, 3-butyl-4-hexyl heptene-1, octadecene-1, dodecene-1, tricosene-1, hexacosene-1, dotriacotene, 5-propyl-7,8-dimethyl nonene-1, 7-methyl nonene-1, 4,5-dimethyl heptene-1, and the like are employed.

EXAMPLE XVIII

When a copolymer of butene-1 and trioxane is prepared according to Example VII and end-capped in the manner set forth in Example XV, the copolymer exhiibts improved thermal stability.

EXAMPLE XIX

When the copolymer of Example VI is end-capped in the manner set forth in Example XV, the copolymer exhibits greatly improved thermal stability.

When the above example is repeated employing olefins such as 4-methyl pentene-1, 3-methyl butene-1, and the like, similar results are obtained.

A 35.0 g. portion of the copolymer was treated with a processing solution of 4.38 g. of toluene-2,4-diisocyanate in 175 g. of dimethylforamide at 144°–150° C. for a period of 60 minutes. This treated portion of the copolymer retained 83.2 percent of its original weight, had an inherent viscosity of 1.26, a polymer melting temperature of 165° C., and a crystalline melting point of 148° C.

The acetylated portion of the copolymer (unstabilized) had a weight retention of 93.7 percent after one hour and 67.5 percent after two hours. The acetylated copolymer when stabilized with 5.0 parts of diphenyl amine had a weight retention of 96.3 percent for one hour and 87.6 percent for two hours. An unstabilized portion of this copolymer had a tensile strength of 8350 lb./sq. in., an elongation of 13.0 percent, and a tensile modulus of 276,200 lb./sq. in. A portion stabilized with 5.0 parts diphenyl amine had a tensile strength of 7250 lb./sq. in., an elongation of 14.0 percent, and a tensile modulus of 196,000 lb./sq.in.

The portion of the copolymer treated with the diisocyanate (unstabilized) had a weight retention of 76.3 percent after one hour and 55.4 percent after two hours. The same copolymer after stabilization with 5.0 parts of diphenylamine had a weight retention of 87.1 percent after one hour and 80.0 percent after two hours. A 1 g. unstabilized plaque of this treated copolymer was found to retain 95.5 percent of its weight after treatment with 10 percent caustic for 5 hours. A diphenylamine stabilized portion of the isocyanate treated copolymer had a tensile strength of 7100 lb./sq. in., an elongation of 16.0 percent, and a tensile modulus of 211,200 lb./sq. in.

EXAMPLE XX

A homopolymer made from trioxane was prepared and end-capped to provide a comparison of thermal stability between end-capped homopolymers and end-capped copolymers of the present invention. The polymerization procedure used was the same as in Examples I–III except that no comonomer was used. Homopolymer yield was 99.2 percent. The homopolymer had an inherent viscosity of 1.29, a polymer melting temperature of 178° C. and a crystalline melting point of 149° C.

One portion of the homopolymer was acetylated as in Example II. The end-capped homopolymer retained 92.3 percent of its original weight, had an inherent viscosity of 1.56, a polymer melting temperature of 174° C., and a crystalline melting point of 150° C.

The acetylated unstabilized homopolymer had a weight retention of 77.4 percent after one hour and 48.1 percent after two hours. A sample stabilized with 5.0 parts diphenylamine had a weight retention of 92.7 percent after one hour and 81.7 percent after two hours.

It can be readily seen by comparing the thermal stability of the end-capped trioxane homopolymer (both unstabilized and stabilized) with the end-capped copolymers of the present invention, generally have significantly higher thermal stabilities.

When conducting the end-capping reaction in suspension, the copolymer may be swollen by soaking in a liquid medium consisting of the liquid end-capping reagent itself or in an organic liquid which is a partial solvent for the copolymer. This pretreatment permits the end-capping liquid to react more readily with the hydroxyl end groups on the ends of the copolymer chains.

In addition to the organic acid anhydrides set forth hereinbefore, the anhydrides of the diacids such as malonic, succinic, glutaric, phthalic, and pyromellitic are also suitable for use as acylating agents.

It can be seen from the foregoing examples that the polyacetal copolymers described hereinbefore can have their thermal stability significantly improved by treating the copolymer with an "end-capping" agent. A significant advantage of the present invention is the provision of a very stable polyacetal copolymer having a high molecular weight at a very high yield as compared to treatments used heretofore to prepare a thermally stable polymer.

The treated polyacetal copolymers of the present invention may be used to prepare molded or extruded shapes, articles, fibers, filaments, films, sheets, rods, tubes, pipes and other articles. Thus these treated copolymers may be put to all the uses known for commercial polyacetal resins such as those set forth in "Acetal Resins," Russell B. Akin, Reinhold Publishing Corporation, New York, 1962, pp. 169–174. The treated copolymers may be modified for particular use by the addition of antioxidants, fillers, pigments, and the like.

Typical of the Lewis acid catalysts which may be employed in the process of this invention are antimony trifluoride, antimony fluoborate, bismuth fluoride, bismuth oxyfluoride, nickelous fluoride, aluminum trifluoride, titanium tetrafluoride, manganous fluoride, manganic fluoride, mercuric fluoride, silver fluoride, zinc fluoride, ammonium bifluoride, phosphorus pentafluoride, hydrogen fluoride, fluosulfonic acid, antimony chloride, stannous chloride, sodium fluoride, potassium fluoride, lithium fluoride, calcium fluoride, magnesium fluoride, barium fluoride, strontium fluoride, lead fluoride, ferric fluoride, ammonium fluoride, thionyl chloride, phosphorous trichloride, stannic chloride, titanium tetrachloride, zirconium chloride, boron trifluoride, diethyl etherate complex, boron trifluoride dibutyl etherate complex, boron fluoride complexes of aryl amines such as aniline, alpha naphthyl amine, pentanaphthyl amine, diphenyl amine and benzidine, boron trifluoride complexes of pyridine, phenothiazine, glycine, alpha alanine, semicarbazide, urea, and the like.

Typical examples of Lewis based catalysts which may be employed in the process of this invention are triphenyl phosphine, tritolyl phosphine, trixylyl phosphine, trinaphthyl arsine, tributyl phosphine, triethyl stibine, dimethyl phenyl arsine, tricyclohexyl phosphine, methyl dioctyl stibine, dixylyl ethyl arsine, trimethyl amine, triethyl amine, trihexyl amine, diethyl amine, di-N-propyl amine, dioctyl amine, cyclohexyl amine, dicyclohexyl amine, piperidine, N-ethyl piperidine, morpholine, N-methyl morpholine, pyrrolidene, N-ethyl pyrrolidine, cesium hydroxide, strontium hydroxide, rubidium hydroxide, sodium hydroxide, potassium hydroxide, lithium hydroxide, barium hydroxide, calcium hydroxide, sodium oxide, sodium peroxide, barium peroxide, and the like.

Typical examples of onium salts which may be employed as catalysts are trimethyl stearyl ammonium laurate, tetra-N-butyl ammonium laurate, triethyl benzyl ammonium laurate, benzyl trimethyl ammonium nonyl phenolate, dimethyl diammonium acetate, dimethyl diammonium benzoate, diethyl dioctadecyl ammonium acetate, N,N-diethyl piperdinium chloride, tetra-N-butyl ammonium iodide, N-phenyl ethyl tetramethylene ammonium iodide, dibutyl octadecamethylene ammonium acetate, bis-(tri-N-butyl ammonium iodide)propane, betaine methyl ester of N-methyl-N-phenyl glycine, 1-(carboxy methyl) pyridinium betaine, (carboxy methyl) tridecyl ammonium chloride, triethyl octadecyl phosphonium bromide, tetraethyl phosphonium iodide, tributyl ethyl phosphonium iodide, phenyl ethyl pentamethyl phosphonium acetate, bis-(triethyl phosphonium acetate)-butane, tributyl sulfonium bromide, trimethyl sulfonium iodide, phenyl dibutyl sulfonium acetate, cyclohexyl diethoxy sulfonium benzoate, and the like.

Metal alloy catalysts which may be employed in the process of this invention are alloys of aluminum with copper, silver, gold, beryllium, magnesium, calcium, strontium, barium, zinc, cadmium, mercury, silicon, titanium, zirconium, germanium, tin, lead, vanadium, niobium, tantalum, antimony, bismuth, chromium, molybdenum, tungsten, manganese, iron, nickel. Specific alloys which have been satisfactory in the past are aluminum magnesium alloys, aluminum cobalt alloys, aluminum copper alloys, aluminum copper manganese alloys, aluminum silicon alloys, aluminum zinc alloys, aluminum magnesium titanium alloys, and alloys containing aluminum, cadmium, zinc, calcium and lithium as well as amalgams of all of the alloys listed hereinabove.

Typical of the organometallic compounds which may be used in the process of this invention as catalysts are phenyl lithium methoxy phenyl sodium, decoxy sodium, copper mercaptide, copper abietate, copper stearate, methyl magnesium iodide, phenyl magnesium bromide, diethoxy magnesium calcium hydride, dimethyl cadmium, diphenyl mercury, calcium isopropioxide, aluminum stearate, tetraisopropyl titanate, diphenyl tin, triphenyl bismuth, dicyclopentadienyl iron, triethyl aluminum, trimethyl aluminum, tri-N-butyl aluminum, triisopropyl aluminum, cobalt carbonyl, iron carbonyl, nickel carbonyl, and the like.

Typical of the heterogeneous mixtures of catalysts which may be employed in the process of this invention are silica alumina, Amberlite IR (acid form) as described hereinbefore, montmorillonite (mixture of silica alumina and magnesia), silica gel, Permutit S–2 (basic form) as described hereinbefore, alumina, chromina, silica magnesia, silica boria, silica zirconia, alumina boria, as well as other metal oxdes, mixed metal oxides and ion exchange resins.

Other forms of heterogeneous catalysts which may be used in the process of this invention are disclosed in "Ion Exchange Technology," Academic Press, New York (1956); "Ion Exchange Resins," by Kunin and Myers, John Wiley and Sons (1950); and "Dowex Ion Exchange," The Dow Chemical Company (1958).

The alpha monoolefinic monomers which may be employed in the present invention are ethylene, propylene, butene-1, pentene-1, hexene-1, heptene-1, octene-1, nonene-1, decene-1, hendecene-1, dodecene-1, tridecene-1, tetradecene-1, pentadecene-1, hexadecene-1, heptadecene-1, octadecene-1, nonadecene-1, eicocene, dococene-1, tricocene-1, tetracocene-1, pentacocene - 1, hexacocene-1, heptacocene-1, octacocene-1, nonacocene-1, tricotene, hentricocene, dotricotene, 3-methyl pentene-1,4-methylpentene-1, 3-propyl pentene-1, 3-propyl-4-methyl pentene-1, 3-methylbutene-1, 3 - propyl-4-methyl hexene-1, 3,4-dimethyl pentene-1, 3-methyl-5-methyl-hexene-1, 3-butyl-4-propylheptene-1, 3 - methyloctene-1, 3-4-5-trimethyloctene-1, 5-propyl-7,8-dimethylnonene-1, 7-methylnonene-1, 8-methylnonene-1, 8,10,12-triethyl octadecene-1, 4-butyl-3 - propyl - 8,9 - trimethyl tricocene - 1, 3-hexyl-4-propyl-10-butyl triacotene-1, 3 - butyl-4,5-dimethyl octene-1, 3-methyl octadecene-1, 4 - methyl octadecene-1, 5-methyl octadecene-1, 6-ethyl octadecene-1, 4,8,9-tributyl octadecene-1, 4,5,10,15-tetraethyl hexacocene-1.

Although the polymers of this invention have improved resistance to chemical and physical degradation, nevertheless for some uses it may be desirable to make use of previously known stabilization techniques in order to effect still further improvement in stability. The techniques which may be so used are in general those procedures which have heretofore been successfully used with hitherto known polyformaldehyde polymers and copolymers. Therefore, stabilizer additives may be compounded with the novel polymers of this invention. Typical of these stabilizer additives are hydrozines (U.S. 2,810,708); hydrozones (Belgian 597,962); phenols (U.S. 2,871,220); ureas and thioureas (U.S. 2,893,972); sulfides and polysulfides (Belgian 599,409); amines (U.S. 2,920,059 and 2,936,298); oxalic diamides (Belgian 584,257); polysulfonic acids (Belgian 585,164); hydroxy anthroquinone (Belgian 585,165); and benzophenones (Australian 230,-163). These stabilizers may be compounded with the novel interpolymers of this invention after the polymerization reaction has been completed.

The polymers may also be subjected to a combination of the compounding of stabilizers and end-capping. Thus one may end-cap the crude polymer by reacting the polymer with an hydride and thereafter compound stabilizers such as hydrazines, phenols, ureas, and the like, with the polymer product.

Another technique by which additional stabilization may be achieved is to rigorously remove catalyst residues from the novel polymers of this invention. Thereupon, if desired, a stabilizer additive or end-capping procedure, or both, may be utilized.

A still different combination which may be used to further stabilize the interpolymers involves caustic treatment followed by addition of stabilizers. Any of the stabilizers referred to hereinabove may be employed subsequent to the preferred caustic after treatment step. This combination of caustic after treatment and subsequent addition of stabilizers is the most preferred method of giving additional stabilization to the interpolymers of this invention.

In all cases where a stabilizer additive is used, it is compounded with the interpolymer in a proportion of between about 0.003 and 15 percent by weight, based on the weight of the polymer. It should be noted that the stabilizers may, in some instances, be added prior to the caustic degradation step. However, it is preferred in most instances to add the stabilizers after the caustic degradation step since a polymer is obtained via this method which is more resistant to thermal degradation and oxidative deterioration.

The copolymers of this invention are useful for the preparation of films (as disclosed in U.S. 2,952,878), sheets, funicular structures such as fibers, filaments, bristles, rods, tubes and molding powders. Thus, the copolymers of this invention may be employed in any general use for which known tough and thermally stable thermoplastic polymers have been put.

Typical methods of molding the interpolymers of this invention are those techniques set forth in "Polymer Processes," vol. X, "High Polymers" by Schildknecht, Interscience Publishers New York (1961). Typical of the described techniques at page 688 are compression molding, jet molding, transfer molding, injection molding, extrusion, etc.

Having thus described this unique invention and its embodiments, it is not intended that this invention be limited except as set forth in the following claims.

What is claimed is:

1. A high molecular weight, high melting interpolymer having an inherent viscosity of from about 0.3 to about 5.0 and a polmer melt temperature of from about 140° C. to about 190° C. of an aldehyde selected from the group consisting of formaldehyde and trioxane and an alpha monoolefinic acyclic hydrocarbon monomer containing from 4–6 carbon atoms in the molecule and having a hydrogen atom on the beta carbon atom, the repeating units of the interpolymer consisting essentially of (A)

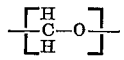

and (B)

[—R—]

wherein R represents a saturated hydrocarbon group corresponding to said hydrocarbon monomer, said (A) units constituting from about 80 mole percent to about 99.9 mole percent of the recurring units in the interpolymer, the balance being essentially said (B) units, said interpolymer being further characterized in that said interpolymer has a thermal stability such that at least 50 percent of the weight of an unstabilized sample of said interpolymer remains after heating at a temperature of about 190° C. under about 1 mm. Hg pressure for two hours.

2. The composition of claim 1 wherein said (B) units constitute from about 1 to about 15 mole percent of the recurring units in the interpolymer.

3. The composition of claim 1 wherein said (B) units constitute from about 2 to about 5 mole percent of the recurring units in the interpolymer.

4. The process for preparing the interpolymer defined in claim 1, comprising copolymerizing under essentially anhydrous conditions an aldehyde selected from the group consisting of formaldehyde and trioxane in admixture with an alpha monoolefinic acyclic hydrocarbon monomer containing from 4–6 carbon atoms in the molecule and having a hydrogen atoms on the beta carbon atom, said alpha monoolefinic acyclic hydrocarbon monomer being employed in an amount ranging from about 0.1 to 20 mole percent of said formaldehyde; said process being conducted at a temperature of from about −90° C. to about 200° C. in the presence of a polymerization catalyst selected from the group consisting of Lewis acids, Lewis bases, onium salts, metals, metal alloys, and metal carbonyls.

5. The process of claim 4 wherein said catalyst is a Lewis acid.

6. The process of claim 4 wherein the said Lewis acid catalyst includes boron trifluoride.

7. The process of claim 4 wherein said alpha monoolefinic acyclic hydrocarbon monomer is butene-1.

8. The process of claim 4 wherein said alpha monoolefinic acyclic hydrocarbon monomer is hexene-1.

References Cited

UNITED STATES PATENTS

| 2,373,561 | 4/1945 | Hanford | 260—67 |
| 2,274,749 | 3/1942 | Smyers | 260—73 |
| 2,998,409 | 8/1961 | Nogare et al. | 260—67 |
| 3,147,234 | 9/1964 | Polly | 260—67 |
| 3,317,477 | 5/1967 | Wilson et al. | 260—73 |

FOREIGN PATENTS

| 877,256 | 9/1961 | Great Britain. |
| 1,272,971 | 8/1961 | France. |

OTHER REFERENCES

Angewondte Chemie: "Polyoxymethylene," Jan. 23, 1961, No. 6, pp. 177–186.

O'Kamura et al., "Gamma-ray Induced Polymerization of Formaldehyde—Isotopes and Radiation," vol 3, 1960, pp. 242–243.

JAMES A. SEIDLECK, Primary Examiner

U.S. Cl. X.R.
260—45.9, 45.95